L. S. ROSS.
MOTOR VEHICLE.
APPLICATION FILED JAN. 22, 1907.
1,082,047.
Patented Dec. 23, 1913.
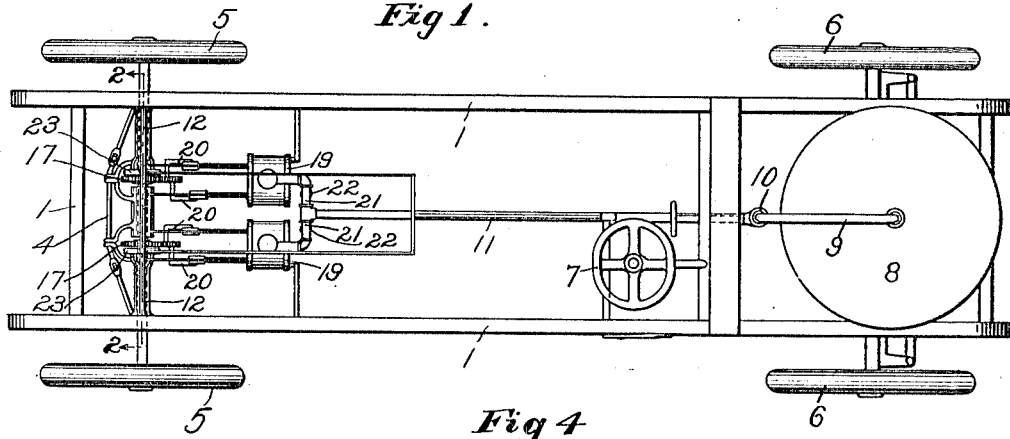
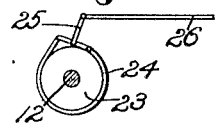
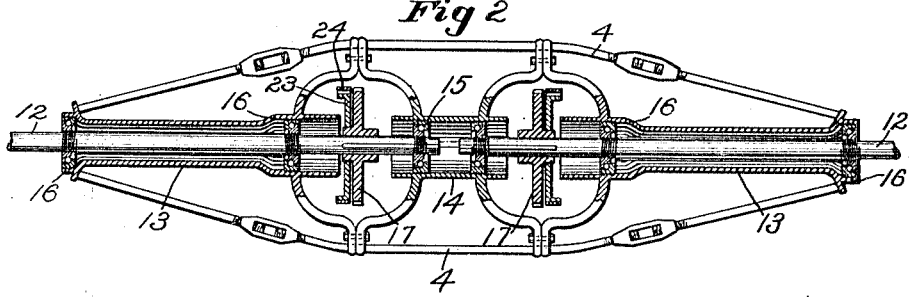
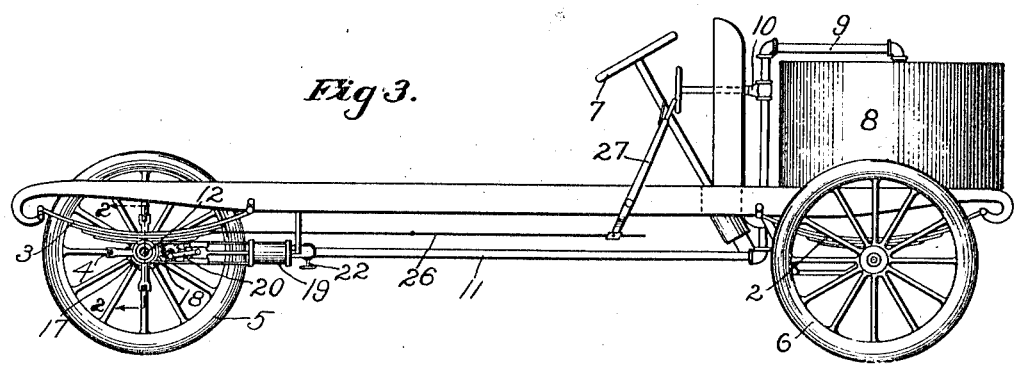
Witnesses:
Edwin T. Luck,
Walter J. Lane.
Inventor:
Louis S. Ross,
by Emery & Booth
Attys.

UNITED STATES PATENT OFFICE.

LOUIS SANFORD ROSS, OF NEWTONVILLE, MASSACHUSETTS.

MOTOR-VEHICLE.

1,082,047.  Specification of Letters Patent.  Patented Dec. 23, 1913.

Application filed January 22, 1907. Serial No. 353,451.

*To all whom it may concern:*

Be it known that I, LOUIS S. ROSS, a citizen of the United States, and resident of Newtonville, county of Middlesex, and State of Massachusetts, have invented an Improvement in Motor Vehicles or Cycles, of which the following description, in connection with the accompanying drawings, is a specification, like letters on the drawings representing like parts.

My invention relates to motor vehicles or cycles and more particularly to the driving and power transmission mechanisms with which they are provided.

As hitherto constructed, motor vehicles, cycles and the like are usually provided with what is termed compensating or balance gears, commonly called "differential gear," the object of which is to allow of differentiation or compensation in the speed of the two geared wheels, which rotate the divided shaft, and the drive wheels. Notwithstanding the many improvements in differential gear mechanism for divided shafts, there are still defective features both in construction and operation which, as yet, have not been overcome. Among these is their ineffective action when running upon ice or snow, or upon muddy or otherwise slippery ground or pavement. It will be apparent, to those skilled in the art, that in running a straight course the drive wheels having the same traction rotate at equal speeds, but in turning or under other conditions, the drive wheel having the least traction is driven rapidly while that having the most traction either turns slowly or may remain at rest. When either wheel runs upon ice, snow or mud, its traction is greatly reduced and if this takes place in turning, the wheel spins rapidly while the other wheel remains relatively stationary, if not actually so, owing to the intermediate connection between the parts of the divided shaft.

My invention aims generally to provide a motor vehicle of improved type that eliminates the use of mechanical differential gear entirely and also contemplates the utilization of the elasticity or expansive force of the driving agent, such as steam, as a differential in turning.

The above, however, with other novel features of my invention, will be best understood and appreciated from the following description, when considered in connection with the accompanying drawings, of an automobile embodying one form of my invention, and selected for purposes of illustration, the invention being more particularly defined and pointed out in the appended claims.

In the drawings: Figure 1 is a plan of an automobile illustrating a selected embodiment of my invention; Fig. 2 a vertical sectional detail taken from the front on the line 2—2, Figs. 1 and 3, and on a somewhat larger scale; Fig. 3, a side elevation thereof, and Fig. 4, a detail to show the connections intermediate the operating lever and brake band.

Referring to the drawings and to the particular embodiment of my invention selected for illustration herein, 1 (Figs. 1 and 3) represents the automobile frame, at the front and rear of which are supporting springs 2 and 3 (Fig. 3), the former being connected with the front axle, the latter with a truss frame 4 carrying the traction wheels 5. The front wheels 6 are controlled by a steering wheel 7 at the front of the frame, in front of which and over the front axle, is a generator 8 connected by a steam pipe 9 and throttle valve 10 with a steam supply pipe 11 leading to the rear of the frame and to suitable engines mounted thereon.

All of the above may be of any desired or suitable construction and, as they form no part of my present invention, need not be further discussed.

Referring now to Fig. 2, I provide at the rear of the frame a divided axle comprising two live or driving shafts 12, each of which has a drive wheel 5 secured in any suitable manner at its outer end and driven with its shaft. An important feature of my invention resides in the means for mounting these drive shafts so that while axially separated one from another, they may be independently and separately driven and yet act as a differential in turning. To this end, I provide the truss frame 4 with a plurality of tubular bearing axles 13 and 14, Fig. 2, extending transversely of the frame and axially arranged and secured to and within the truss frame 4, together constituting a continuous supporting axle for the rear of the body frame. The intermediate tubular bearing axle 14, is centrally arranged and provided with suitable friction bearings; for example, ball bearings 15, for the inner ends of the independent driving shafts 12, the bearing axles 13 having similar ball-bearings 16 preferably adjacent its ends for said shafts. These ball bearings 15 and 16 also act as and constitute thrust bearings to prevent longitudinal movement of said shafts. Each of these shafts is adapted to rotate freely in its bearings and has no connection with the other, so that rotation of one can have no effect upon the other. For driving these separated shafts independently, each is provided with a gear wheel 17, shown as splined thereto (Fig. 2), which may be of any desired type or construction according to the type and arrangement of engine it is preferred to use. In the present embodiment of my invention, however, said gear wheel is meshed with a straight gear wheel 18, mounted on said truss frame 4 in front of its drive shaft 12. Rotation of this gear wheel 18 rotates the gear 17 and shaft 12 and hence its drive wheel 5. For driving this gear 18, any suitable or desired type of engine may be employed and my invention contemplates the use of both steam and gas engines, but I prefer that herein shown, wherein a steam engine 19 of the double or twin cylinder type is provided, having their connecting rods 20 coupled at right angles to said gear 18, so that the engine has no dead center and is always ready to operate when steam is up. These engines may be supported or mounted in any suitable manner but as here shown are preferably arranged horizontally, Fig. 1, in the same plane as said shafts 12. The steam pipe 11 branches through the side pipes 21, Fig. 1, to the separate engines for each shaft, 12, and each pipe has an independent throttle valve 22 by which the engine may be controlled. Each shaft is also provided with suitable brake mechanism by which the load may be increased so as to govern the speed of rotation. In the present instance, I provide a disk 23 having a brake band 24 having its ends connected by a toggle lever 25. These two toggle levers are adapted to be simultaneously operated and to that end are connected by a link 26, Fig. 3, to an operative lever 27, Fig. 3, at the front of the machine.

In operation, each engine independently drives its own shaft 12 and drive wheel 5 and each wheel, when running on a straight course, rotates at the same speed and as long as the load or traction of each wheel is substantially the same. When the automobile is turned however, the pivot wheel or the one moving on a shorter radius, has greater traction, which increases the load on the engine, diminishes its speed of driving, and hence the speed of the axle and wheel driven thereby. The other drive wheel, however, moving on a flatter curve of longer radius and through a greater distance, has much less traction than when running straight, reducing the load on the engine and rotating, or causing said wheel to run, at higher speed, and as is desired in turning corners or running on curves. By this arrangement, it will be apparent that the two engines and the two driven shafts and wheels operate even more efficiently than a divided shaft provided with differential gear, has all the advantages of the latter and, so far as known, none of the disadvantages.

Each engine, continuously transmits more or less power to and drives its connected wheel continuously, independent of the operation of the other. These drive wheels are thus always moved by their own power; some power, and this is of considerable importance, always being at work on each wheel though producing different speeds of driving or rotation. This is a decided advantage over the differential gear mechanism as the latter frequently throws all power upon one wheel and if the latter happens to be spinning on ice or snow and the other stationary as described, causes the automobile to stop. It will, furthermore, be apparent that by having some power always upon both wheels, much of the lurching and sluing will be eliminated and the danger resulting therefrom reduced to a minimum.

The variation in speeds of the wheels 5, produced by the variation in load or traction is effected through the steam itself, which, because of its expansive force or elasticity, automatically adapts itself to the variation in load or traction and within certain limits is controlled thereby. My invention thus provides means to permit the steam to function as a differential gear and as an equivalent therefor. My invention also contemplates driving an automobile from either side or one side only. In the present instance, this result is attained in a simple manner by providing the branch pipes 21 with the independent and auxiliary throttles 22 described, so that the steam for the engine 19, controlled thereby, may be shut off or admitted. With one throttle closed and the other open, the drive wheel at but one side of the frame will be driven, but this will rotate with sufficient force and speed to drive the automobile. By varying the admission of steam to each engine the work of the two engines when operated simultaneously may be distributed or varied so as to favor one or the other side as conditions may require or as may be desired.

By my invention I have provided simple and effective differential driving mechanism of novel type and construction, that utilizes the expansive or elastic force of the driving agent, for example, steam, as a differential by the provision of independent engines for each drive shaft, the speed of which is varied by the load or traction.

So far as I am aware and believe I am the first to provide an automobile or other motor vehicle or cycle with power transmission and driving mechanism of this type or of any type that utilizes the inherent elasticity of the steam as a differential.

My invention, obviously, is not limited to the specific embodiment of my invention herein shown and described nor to the specific details of construction and arrangement, it being understood that the same is here selected for purposes of illustration only and may be modified within wide limits without departing from the spirit and scope thereof.

Having thus described my invention, what I claim and desire to secure by Letters Patent is:—

1. In a motor vehicle, the combination of a frame, an axially separated sectional hollow bearing axle, a sectional axle having its several ends journaled therein, two of said ends being journaled in the same bearing section, a driving wheel on each axle section and positioned between adjacent ends of said bearing axles, and an engine for separately driving each driving wheel.

2. In a motor vehicle or cycle, a frame, a plurality of separated tubular bearing axles, including one at each side of the frame and one arranged intermediate the same to provide a central bearing, said axles being arranged transversely and axially beneath the frame and provided with means for securing them thereto, a driving shaft mounted in each of the side bearing axles, having its inner end journaled in said central bearing axle, and an engine connected to each shaft intermediate its bearings for driving the same.

In testimony whereof, I have signed my name to this specification, in the presence of two subscribing witnesses.

LOUIS SANFORD ROSS.

Witnesses:
SIDNEY F. SMITH,
EVERETT S. EMERY.